United States Patent [19]

Alban

[11] 4,007,634
[45] Feb. 15, 1977

[54] FUEL RATE MONITOR APPARATUS FOR VEHICLES

[76] Inventor: William R. Alban, R.R. No. 1, Galena, Ohio 43021

[22] Filed: Oct. 28, 1975

[21] Appl. No.: 625,946

[52] U.S. Cl. ............................................. 73/114
[51] Int. Cl.² ....................................... G01F 9/00
[58] Field of Search ........................... 73/114, 113; 235/150.21

[56] References Cited

UNITED STATES PATENTS

| | | | |
|---|---|---|---|
| 3,549,868 | 12/1970 | Watson et al. | 73/114 X |
| 3,908,451 | 9/1975 | Walker et al. | 73/114 |
| 3,927,305 | 12/1975 | Gruhl | 73/114 X |

FOREIGN PATENTS OR APPLICATIONS

| | | | |
|---|---|---|---|
| 1,365,897 | 9/1974 | United Kingdom | 73/114 |

Primary Examiner—Jerry W. Myracle
Attorney, Agent, or Firm—Palmer Fultz

[57] ABSTRACT

A digital fuel rate monitor apparatus for vehicles which apparatus measures signals proportional to units of fuel flow volume and signals proportional to distance of vehicle travel and electronically relating such signals to effect digital readout in miles per gallon. The apparatus is characterized by a positive displacement flow volume monitoring cylinder that includes a low friction piston and seal arrangement and associated control apparatus which are adapted to reveal piston position with respect to the metering cylinder in a highly accurate manner.

18 Claims, 17 Drawing Figures

4,007,634

FUEL RATE MONITOR APPARATUS FOR VEHICLES

BACKGROUND OF THE INVENTION

This invention relates to fuel rate monitor apparatus for vehicles and more particularly to such an apparatus which automatically effects digital readouts in miles per gallon. The invention further relates to a flow monitoring cylinder provided with a position revealing piston and seal arrangement adapted to signal piston position with respect to the cylinder respective to flow volume in a highly precise manner.

SUMMARY OF THE INVENTION

In general, the fuel flow monitor of the present invention includes a positive displacement flow volume metering means which is mountable in the fuel flow to an automobile engine and which measures fuel flow in small digital units of volume. Such volume metering means is further adapted to produce fuel flow signals which are delivered to a control circuit means.

The monitor further includes a vehicle travel measurement means for delivering vehicle travel in small digital units of distance which elapse during a measured fuel flow volume. Such measurement means is connected to the above mentioned control circuit means for delivering distance traveled signals thereto.

The control circuit means is further adapted to electronically relate the above mentioned signals to effect single digital readout in miles per gallon.

As another aspect of the present invention the monitoring apparatus includes a positive displacement fuel metering cylinder which includes a novel position revealing piston and flexible seal assembly that signals the position of the assembly in the cylinder, said piston and seal assembly being of high sensitivity and low friction so as to provide extremely precise digital readouts.

As still another aspect of the present invention the monitoring apparatus includes a positive displacement fluid metering cylinder which includes a novel position revealing piston and flexible seal assembly which is adapted to yield over center in both of its directions of travel, responsive to fuel pressure, from a first sealing configuration to a second pressure relief configuration thereby providing a fail-safe feature for the system.

It is another aspect of the present invention to provide a monitor apparatus of the type described that includes a novel flow volume metering cylnder and associated piston control circuit for controlling reciprocation of the above mentioned position revealing piston in the metering cylinder.

It is another aspect of the present invention to provide a fluid flow monitor of the type described that includes a flow volume metering cylinder and associated control valve apparatus which apparatus effects reciprocation of the above mentioned position revealing piston and also provides a fuel by-pass feature for the metering cylinder.

It is another aspect of the present invention to provide a fuel flow monitor of the type described which includes a positive displacement metering cylinder and associated adjustable sensors which permit adjustment of the linear vehicle travel per wheel count of the particular vehicle on which the apparatus is installed. The sensor mode exemplified here is magnetic wherein the position signal is conveyed by a magnetic piston and monitored by external sensors adjustable in displacement proportional to wheel travel units. It will be understood that the piston position can be conveyed by other means.

It is, therefore, an object of the present invention to provide a novel fuel flow monitor apparatus which automatically provides digital readout of miles per gallon being obtained during operation of the vehicle.

It is another object of the present invention to provide an apparatus of the type described which includes a novel flow volume metering cylinder and associated control apparatus for delivering flow volume and distance traveled signals to an electronic control circuit from which single digital readouts in miles per gallon are effected.

It is another object of the present invention to provide an apparatus of the type described which includes a novel flow volume metering cylinder that operates with high sensitivity and precision thereby producing readouts of high precision.

It is another object of the present invention to provide an apparatus of the type described that includes a positive displacement metering cylinder provided with a fail-safe relief valve feature.

It is still another object of the present invention to provide a flow volume monitor that includes a unique piston and seal arrangement of high sensitivity.

Further objects and advantages of the present invention will be apparent from the following description, reference being had to the accompanying drawings wherein a preferred form of embodiment of the invention is clearly shown.

BRIEF DESCRIPTION OF THE DRAWINGS

Figure 7:
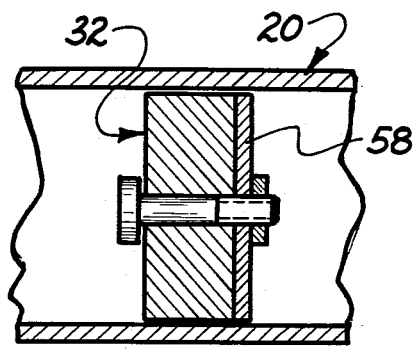
FIG. 7 is a partial sectional view showing a piston mounted in the metering cylinder of the preceding figures, the section being taken along the line 7—7 of FIG. 1.

Referring in detail to the drawings, the digital fuel rate monitor apparatus comprises a positive displacement metering cylinder assembly indicated generally at 20 which includes cylinder 22 mounted between end bulk heads 24 and 26 the latter being joined by four tie bolts 28 the ends of which include nuts 30. The interior of metering cylinder 20 is provided with a magnetic piston and seal assembly indicated generally at 32, FIGS. 7 and 9.

As best seen in FIGS. 1 through 8, the metering cylinder assembly 20 further includes a stationary sensor mount block 34 and an adjustable sensor mount block 36 which mount sensors A and B respectively with sensor A being mounted in fixed relationship on a threaded shaft 38 by self-locking nuts 40 and 42 with a non-magnetic spring 44 and non-magnetic thrust washers 46 being interposed between nut 42 and stationary block 34 for the purpose of elminating end play between the sensor blocks and to add stabilized friction force.

Figure 3:
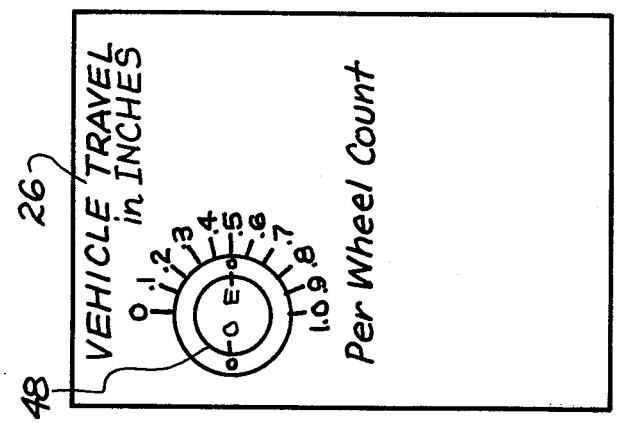
FIG. 3 is an end elevational view of the apparatus of FIG. 1.
Figure 1:
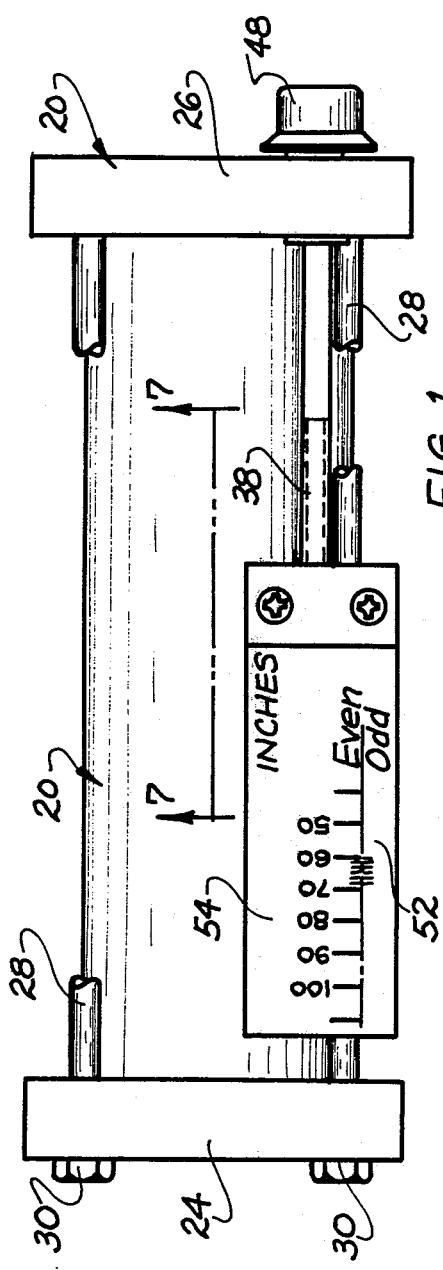
FIG. 1 is a side elevational view of a fuel metering cylinder and associated sensor and control apparatus constructed in accordance with the present invention.
Figure 2:
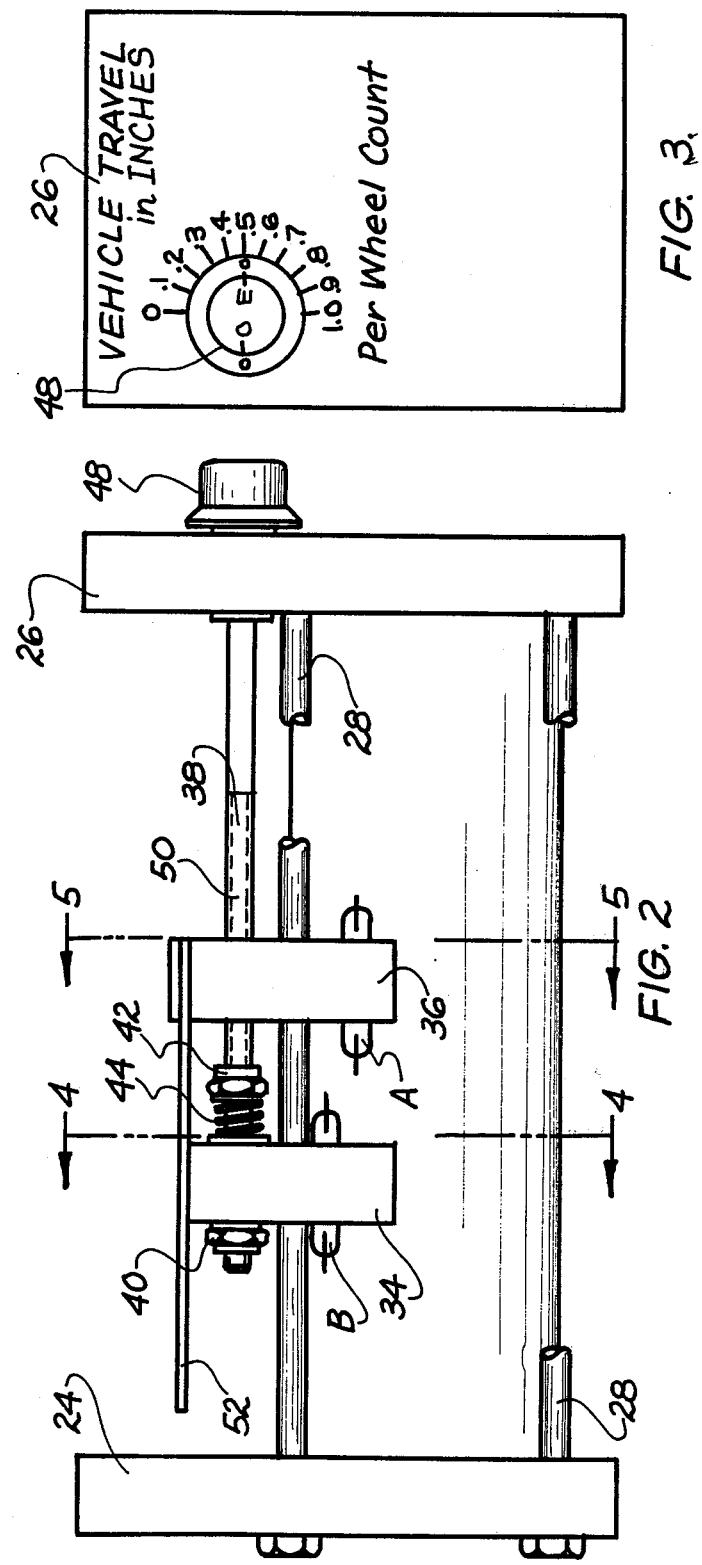
FIG. 2 is a side elevational view of the apparatus of FIG. 1.
Figure 4:
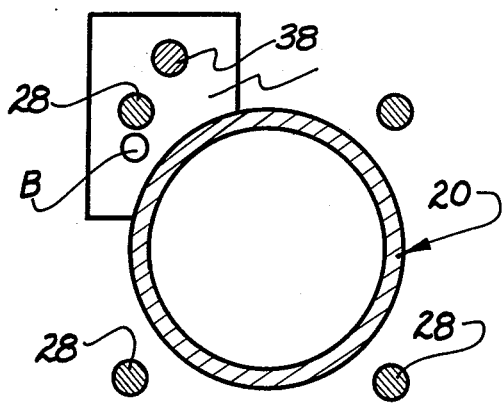
FIG. 4 is an end sectional view of the apparatus of the preceding figures, the section being taken along the line 4—4 of FIG. 2.
Figure 5:
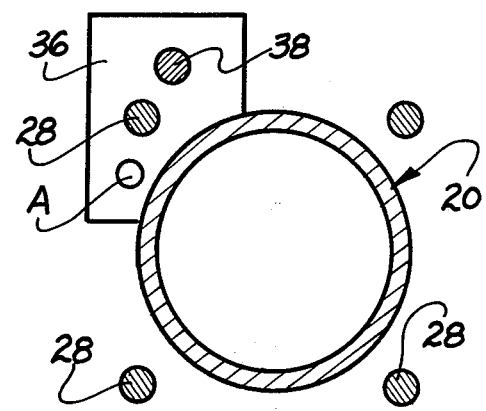
FIG. 5 is a second end elevational view of the apparatus of the preceding figures, the section being taken along the line 5—5 of FIG. 2.
Figure 6:
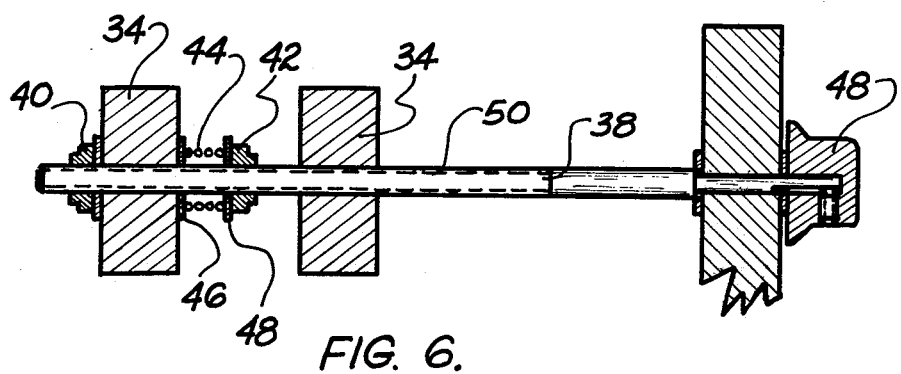
FIG. 6 is a partial side elevational view of a sensor adjusting means comprising a portion of the apparatus of the preceding figures.

As is best seen in FIGS. 2 and 3, the outer end of shaft 38 is provided with a rotary index knob 48 which, when turned, moves adjustable sensor mount block 36 along a threaded portion 50 of shaft 38. Adjustable mount block 36 carries a linear index scale 52 with such scale being formed of transparent plastic material with index lines 54 on the underside thereof.

Figure 8:
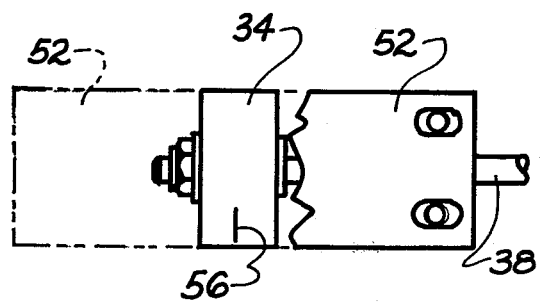
FIG. 8 is a partial broken view of the apparatus of the preceding figures.

As is best seen in FIG. 8, the top of stationary sensor mount block 34 is provided with a black index line 56 on a white background with such index line being positioned to register with the index lines 54 on linear index scale 52.

At this point, it should be mentioned that sensors A and B are in the form of magnetic read switches bonded into holes through plastic mount blocks 34 and 36 with such sensors being activated by a disc-shaped magnet 58 carried by piston and seal assembly 32.

Figure 9:
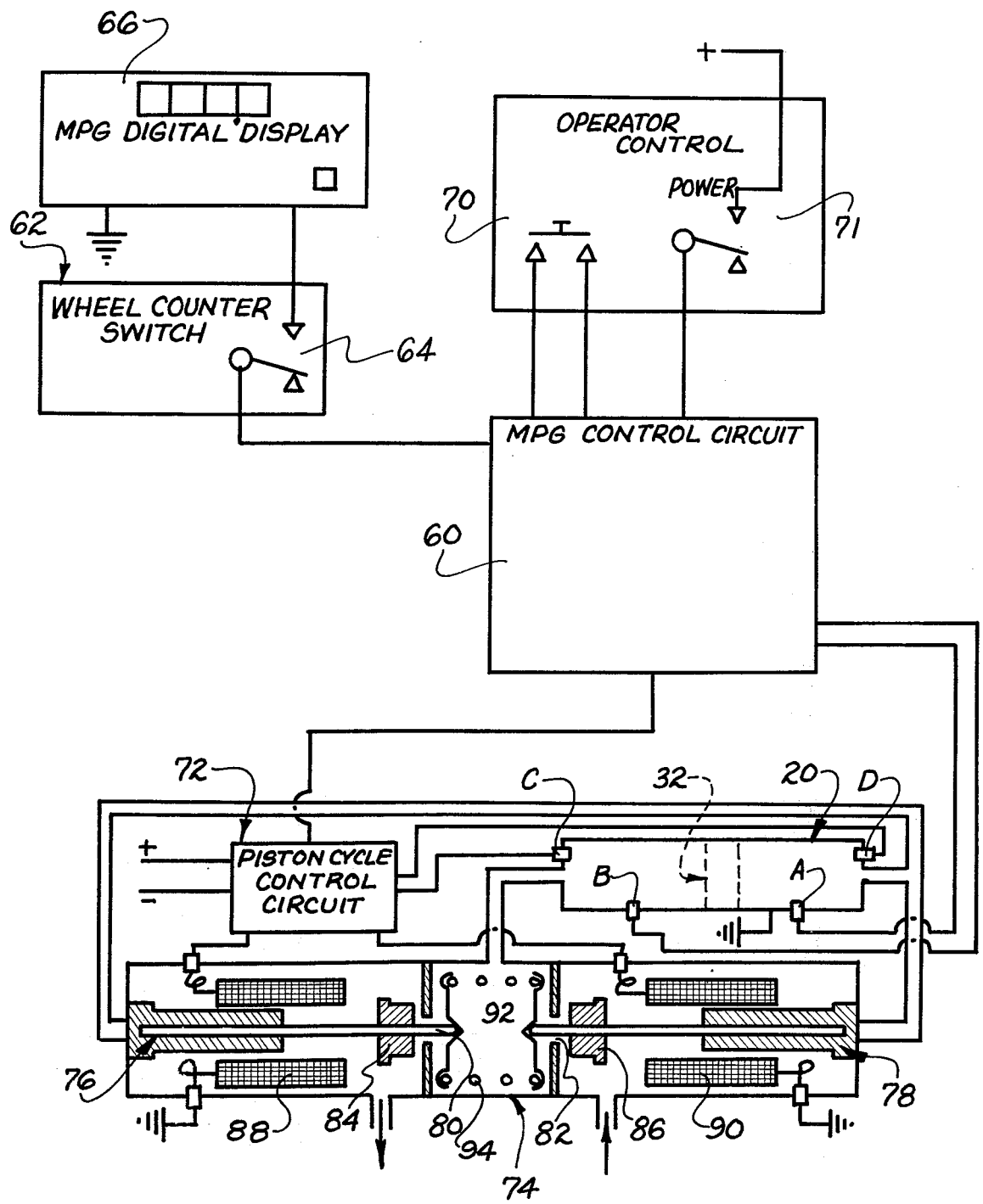
FIG. 9 is a diagrammatic view of a complete fuel rate monitor apparatus constructed in accordance with the present invention.

With reference to FIG. 9, it should be mentioned in general that the fuel flow volume is measured by the above mentioned positive displacement metering cylinder 20 by movement of the piston assembly 32 between the sensors A and B. A basic fuel volume unit is selected, for example, 0.01 gallon, and a 12 VDC electric impulse signal is produced by a control circuit means indicated generally at 50 in FIG. 9.

The system further utilizes a distance traveled unit in the form of vehicle travel per wheel count on distance traveled in one rotation of a monitored wheel or speedometer cable. The signal is also 12 VDC and is produced by a wheel counter indicated generally at 62 which is in the form of a wheel count switch 64 but could, for example, be in the form of a commutator switch mounted on the speedometer cable.

A standard distance unit is selected, for example, .001 mile, for one wheel count.

The above mentioned fuel flow units and distance units are related by the control circuit means 60 so as to effect a digital readout in miles per gallon at the digital display panel 66.

It should be mentioned that when sensor A is activated by piston assembly 32, then wheel counts are caused to enter a digital register in control circuit 60. When sensor B is tripped by piston assembly 32 the digital count is terminated and a reading in miles per gallon is displayed. As a typical example, a vehicle traveling 50 miles per hour registers 136 wheel counts while 0.01 gallons of fuel passes to engine. MPG = 136 × 0.001 miles / 0.01 gallon = 13.6 MPG. Duration of test = 0.136 miles / 50 miles / hours × 0.0072 hours, or 9.79 seconds. This does not include piston travel time prior to sensor A position.

In setting up the present system it is necessary to adjust vehicle distance to effect true MPG digital readout. The fuel unit between piston movement from sensor A to sensor B can be 0.01 gallons ± 0.5%. However, one wheel count may not move the vehicle 0.001 miles which is 5.25 feet or 63.36 inches. In the relationship, MPG = miles / gallon, either the miles or the gallons may be adjusted. The tire size cannot be adjusted, so the metered volume is adjusted. This is done by having sensor B in a fixed position and adjusting the position of sensor A. The adjustment relationship is linear, only a convenient scale and positive indicated is required.

An example by which metered volume is adjusted to effect true MPG digital readout is examplified as follows with inches being the distance measure unit:

The digital distance unit = 0.001 miles = 63.36 inches

The digital volume unit = 0.001 gallon − 2.31 cubic inches $D$ 32 piston diameter $d_o$ = piston displacement for 2.31 cubic inches $D^2 \pi / 4 \times d_o = 2.31$ cubic inches $D = (2.94118 / d_o)^{1/2}$ inches For accuracy the sensor A is moved by micrometer type displacement. Each rotation of the rotary index knob 48 corresponds to two inches of vehicle travel. The rotary index knob 48 has two index dots, labeled E for even and O for odd, so that one full rotation wipes past two inches of index marks. Based on optimum cylinder size and thread standards, 24 threads per inch was selected for the micrometer drive. The linear scale and piston diameter are thus:

$d_o = 63.36$ indicated / (24 × 2 inches per turn) = 1.32 inches $D = (2.94118 \ 1.32)^{1/2} = 1.493$ inches Area of piston = $D^2 \pi / 4 = 1.75$ square inches The linear scale 52 is delineated with long index marks and numerals at 10 inch intervals from 50 to 100. A short index mark is placed to indicate one inch of adjustment. The space between each mark is 1.32 inches / 63.36, or 0.020833 inches. For initial calibration, after a volume of 0.01 gallons has passed between sensor A signal and sensor B signal, linear scale is set just past 63 inches and the rotary index knob 48 at 0.36 on the odd index.

A vehicle travels 82.25 inches for each wheel count, determined by 10 count measurement. Value of 82.25 is indexed into meter by micrometer. Fuel rate is monitored at 50 MPH, and 136 wheel counts enter register while piston moves from sensor A to sensor B. The fuel rate of 13.6 MPG is displayed on register and remains until reset.

$$MPG = \frac{(136 \times 82.25 \text{ inches})/63360 \text{ inches/mile}}{(1.75 \text{ sq. in.}) \times (82.25 \times) .020833 \text{ in.})/2.31 \text{ cu. in./gal.}}$$

$$= \frac{0.175467 \text{ miles}}{0.01298238 \text{ gallon}} = 13.6 \text{ MPG}$$

Duration of test, not including piston travel before $$\text{sensor } A = \frac{(136 \times 82.25 \text{ in.})/(63.36 \text{ in.}/0.001 \text{ miles})}{50 \text{ miles/hours}}$$

$$= \frac{0.176547 \text{ miles}}{50 \text{ miles/hour}} = 0.00353 \text{ hour} = 12.72 \text{ seconds}$$

The following is an example of a way to measure vehicle travel per wheel count it being understood that this be done only initially. First it is necessary to select a straight and level pavement area along which the vehicle is slowly driven with an assistant walking along with the vehicle. A miles per gallon initiation switch 70, FIG. 9, is actuated and when the first count registers the vehicle is stopped whereby the assistant makes a chalk mark on the ground directly below a bumper end at initial and final positions. This method will work when a speedometer cable commutator is employed as well as when a wheel switch is used. An alternative method can be employed when a wheel switch is used whereby the assistant makes a chalk mark on a count wheel tire sidewall as well as the pavement at the point of ground contact. The digital register is then reset to zero, the vehicle is started again, and when the count reaches 10 the vehicle is stopped. The assistant now marks the pavement in line with the index mark on the tire and the distance between the marks on the pavement is now measured in inches and divided by 10. This measurement should be taken several times and averaged.

Example: Vehicle moves 68 feet, 6½ inches in 10 wheel counts.

$$\text{Vehicle travel per count} = \frac{(68 \times 12 + 6\frac{1}{2}) \text{in.}}{10} = 82.25 \text{ inches}$$

Next enter vehicle travel per wheel count into meter. Note the existing setting by reading the linear and rotary index. Change setting to read value measured.

Example: Initial setting reads 63 on the linear scale and 0.36 on odd rotary index. Turn rotary knob 48 clockwise until the linear index is just past 82 and the rotary index is at 0.25 on even index mark.

The above procedure should be redone with a tire change on monitor wheel, detectable tire wear, change in tire pressure, or with a 30° F change in air temperature.

Reference is next made to FIGS. 9 through 13 which illustrate a piston cycle control circuit indicated generally at 72 and an associated control valve mechanism indicated generally at 74. As is best seen in FIG. 9, each end of metering cylinder 20 includes a piston control sensor C and D respectively, with each of such sensors being energized upon engagement by piston assembly 32 at an end of its stroke, with the sensors being connected in circuit with piston cycle control circuit 72 so as to selectively energize valve solenoids 88 and 90 and thereby effect reversal of the piston travel as to be later described. The piston cycle control circuit 72 is connected to and monitored by the main control circuit means 60 and in general functions to shift valve plungers 76 and 78 against and away from seats 80 and 82. The inner ends of such plungers include seat engaging pads 84 and 86 with the bodies of the plungers including soft iron core portions disposed within solenoids 88 and 90.

Figure 10:
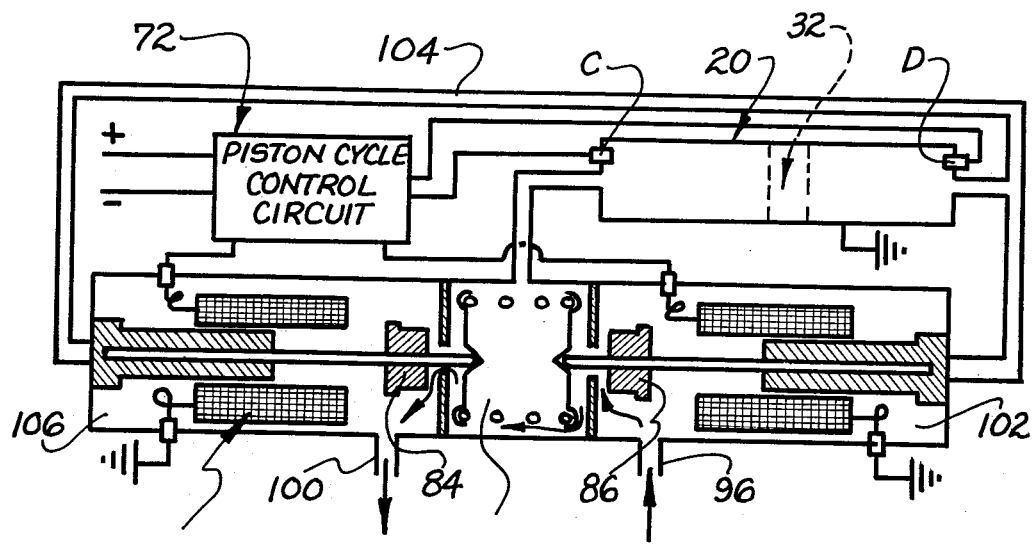
FIG. 10 through FIG. 13 are diagrammatic views showing a piston control valve in various operational configuration thereof.

It should be mentioned that the inner ends of valve plungers 76 and 78 each engage a respective spring retainer 92 with a complex spring 94 being interposed between spring retainers 92 for urging seat engaging pads 84 and 86 to the normally open positions illustrated in FIGS. 9 and 10.

FIG. 10 illustrates a normal fluid by-pass position, without power, wherein fuel enters a valve inlet 96, flows through a central chamber 98, and then through valve outlet 100 to the carburetor of the engine. This condition of FIG. 10 exists when the power is off and there is no electric power being delivered to either of the solenoids 88 and 90. It is also the valve position, when power has for some reason failed, whereby spring 94 forces plungers 76 and 78 to open by-pass position. Hence, it is seen that the valve is inherently fail-safe in the event of power failure.

Figure 11:
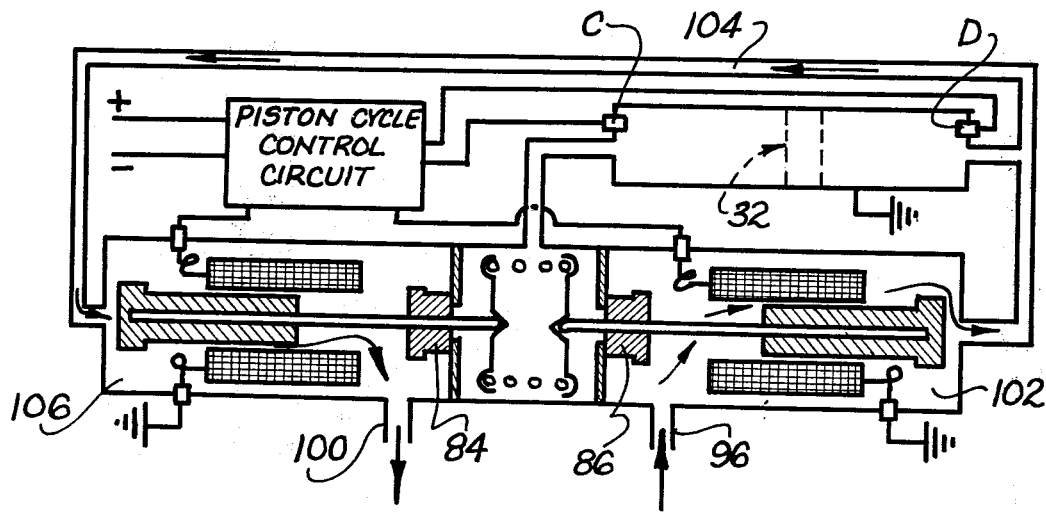

Reference is next made to FIG. 11 which illustrates the valve configuration when both of the solenoids 88 and 90 are for some reason energized, for example, in the event of electrical malfunction. In this configuration, fuel will by-pass metering cylinder 20 in the path shown by the arrows whereby it is seen that fluid enters valve inlet 96, solenoid chamber 102, by-pass line 104, solenoid chamber 106, and thence out through valve outlet 100 to the carburetor of the engine. Hence, it will be seen that the valve configuration is fail-safe, with by-pass of the metering cylinder occurring, in the event of an electrical manfunction.

Figure 12:
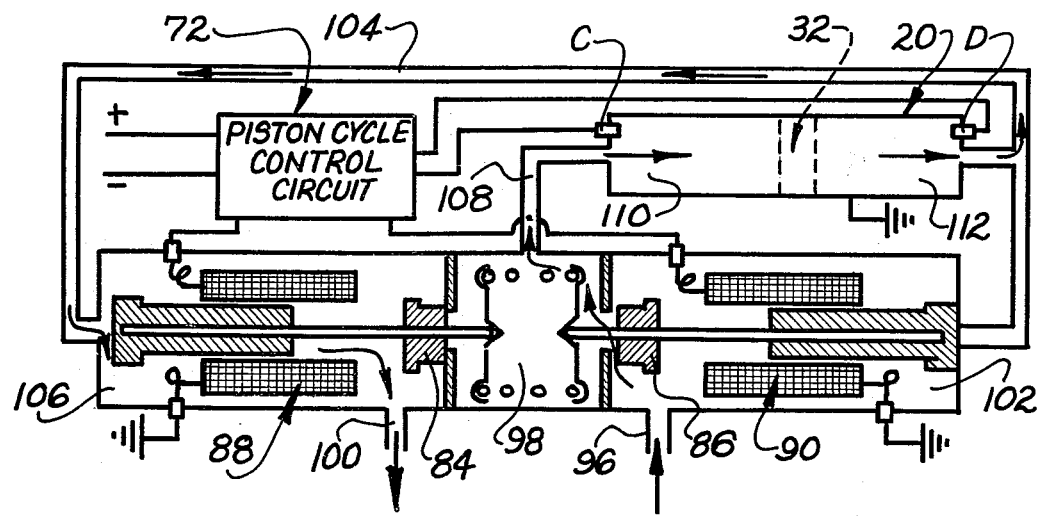

Reference is next made to FIG. 12 which shows the valve configuration when piston assembly 32 is moving to the right. In this instance solenoid 88 has been energized by the prior engagement of piston assembly 32 with piston control sensor C such that pad 84 has been moved against its seat with pad 86 remaining in an open position. Hence the fuel flow will be via valve inlet 96, chambers 102 and 98, line 108, and chamber 110. As the piston moves to the right fluid is exhausted from a chamber 112 via line 104, chamber 106, and valve outlet 100.

Figure 13:
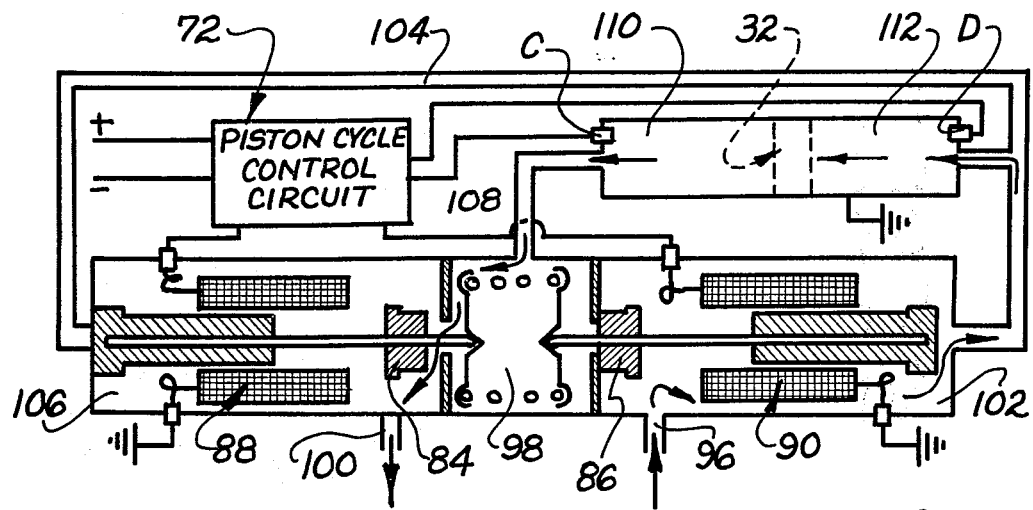

Referring next to FIG. 13, piston assembly 32 is shown traveling to the left wherein a reverse valve configuration is present. Here solenoid 90 is energized moving pad 86 against its seat with pad 84 in an open configuration. Hence the flow is via fuel inlet 96, chamber 102, and line 104 to chamber 112. As piston 32 moves to the left fluid is discharged from chamber 110 via line 108, chamber 98 and 106, and then outwardly through valve outlet 100 to the carburetor of the engine.

Reference is next made to FIGS. 14 through 18 which illustrate the previously mentioned piston and seal assembly 32. Such assembly includes piston ends 116 and 118 which serve as a mount for an annular sealing element 120 which includes a wiping edge 122 and base flanges 124 disposed in inwardly facing grooves 126 of the piston ends. It will be noted from FIG. 14 that the piston ends 116 and 118 include by-pass relief passages 142 and the periphery thereof form annular stabilizing shoulders 128.

The two piston ends are joined together by a bolt 130 and a self-locking nut 132 with such bolt nut being formed of non-metallic material. A plurality of thin washers 134 are used as spacers for adjusting the distance between the cylinder ends and a fluid seal washer 136 is provided under the head of the bolt. Also a thrust washer 138 of non-magnetic material is provided under lock nut 132.

Figure 16:
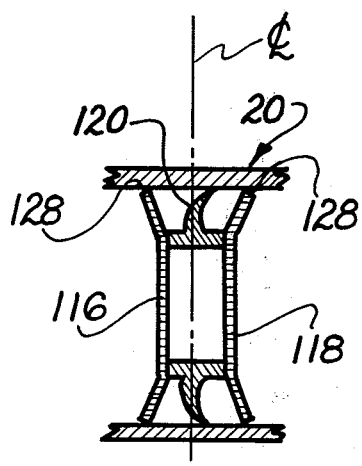
FIG. 16 and FIG. 17 are diagrammatic views showing the piston and seal apparatus in FIG. 14 in various operational configurations thereof.
Figure 17:
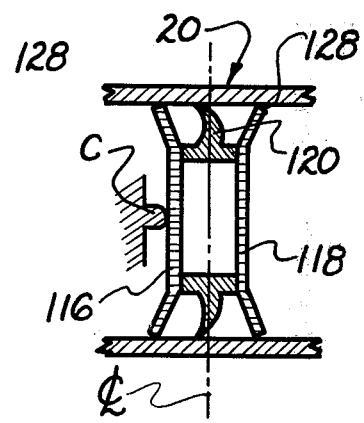

Reference is next made to FIGS. 16 and 17. In FIG. 16 the piston is shown traveling to the left with the seal 120 having its wiper edge slightly trailing the center line of the piston. When the piston arrives at the end of the stroke, as seen in FIG. 17, and engages a previously mentioned sensor, FIG. 17, such as sensor C, and in the event that such sensor has jammed or there is an electrical failure such that no reversing signal is delivered, then in that event the very small pressure required to move the piston begins to build up on the right side of the piston causing flexible seal 120 to move over center to the configuration seen in FIG. 17. The pressure will then drop to a steady value as fluid is driven past the sealing edge of the piston. It will be understood that the magnitude of pressure required for seal by-pass can be controlled by pre-load seal forces and flexible characteristics of the material. Hence, it will be seen that the flexible seal functions as a fail-safe pressure relief valve.

Figure 14:
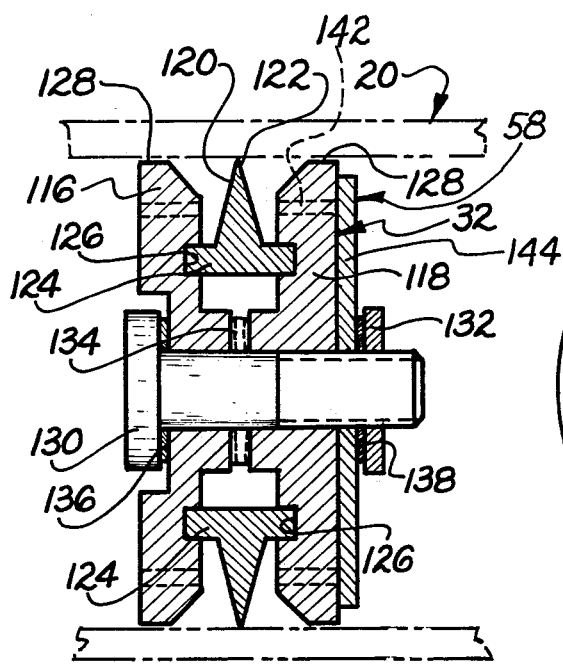
FIG. 14 is a side sectional view of a position revealing piston and seal apparatus comprising a portion of the monitor apparatus of the preceding figures.
Figure 15:
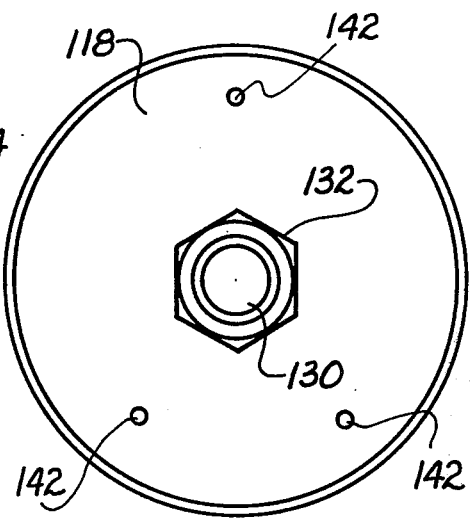
FIG. 15 is an end elevational view corresponding to FIG. 14.

In the preferred seal configuration, the seal is molded to approximately the shape shown in FIG. 14 with an outside diameter of 1.500 inches when used with an inside cylinder diameter of 1.500 inches, an inside diameter of 0.75 inches. The seal wedge is 30° with the base width of 0.375 at the anchor rings.

The diameter of the cylinder ends, which are formed of plastic material, is preferably 1.48 inches so as to provide proper stabilization of the end seal assembly. It should be mentioned that the by-pass relief holes 142 are an optional feature and may be desirable depending on the flow volume requirements.

It has been determined that with a piston seal configuration and side mentioned above a very low motive force is required to move the piston with resulting high efficiency. It has been determined that the pressure differential across piston 32 is from 0.2 to 0.4 psi with the piston in motion and a 0.6 psi maximum pressure for over center movement to induce initial motion.

With a operational differential pressure range of 1.5 psi or less, the leakage by the piston is extremely low in the area of 0.000006 gallons per hour.

It has been further determined that the seal is responsive to fuel flow in the 0.2 to 20 gallons per hour range.

Referring again to the seal 120, it is formed of rubber type material and must include a narrow peripheral sealing edge which edge is held against the cylinder wall by piston ends 116 and 118. The piston ends give fixity to the seal structure, form an end diaphragm, and, as a pair, give axial stability to the piston assembly. The stabilizing edges 128 of the piston ends have clearance and smoothness to invite minimum drag when contacting the cylinder wall in performing as a stabilizer. The seal surface configuration is shown feather thin and thus represents the application of a very narrow and light seal surface, yet effective. The seal and the cylinder surface must be very smooth and void of scratches of nicks.

The feather thin sealing edge shown is effective. However, a radius on the sealing edge will also work with a variation in operating characteristics.

The rubber type material must have flexure and retain residual forces within the material for an extended period of time. The magnitude of the residual forces are controlled by the geometrics of the seal and piston ends which provide end fixity and can also induce residual forces. The residual forces required for effective function is a wide band permitting some erosion of internal stress, seal wear, and some transient variations.

The piston is unrestricted in axial motion except for end sensors and friction at the seal surface, with the piston being driven by the differential pressure across it. If the differential pressure needed to overcome friction at the seal is less than the differential pressure required for leakage, the piston will move without fluid leakage past seal.

Mechanical fluid leakage is fluid flow and must be powered by a differential pressure. Thus, low friction leads to a low differential pressure and a very low potential for seal leakage.

It should further be pointed out that the seal force and friction decrease when the piston is moving and when the piston encounters the small force of the end sensors, the seal, if it moves at all, will move to a position of greater seal force again discouraging leakage.

In operation, the power switch 71 is first turned on and the miles per gallon register 66 is reset to zero if required. The operator next pushes the initiation switch 70 which energizes the main control circuit means 60. Such circuit functions to initiate operation of piston cycle control circuit 72 which starts piston motion towards sensor C and then towards sensor D. This assures that the piston is moving in the correct direction and in uniform motion past sensors A and B. Wheel count and piston motion stop at sensor B with the miles per gallon readout appearing in the register. This miles per gallon readout remains until reset.

While the form of embodiment of the present invention as herein disclosed constitutes a preferred form, it is to be understood that other forms might be adopted.

What is claim is:

1. A digital fuel rate monitor apparatus for vehicles comprising, in combination, control circuit means including signal producing means for producing signals proportional to units of fuel flow volume and units of distance of vehicle travel and for relating such units to effect a single digital readout in miles per gallon; a positive displacement flow volume metering means mountable in said fuel flow for measuring fuel flow in small digital units of volume and for delivering fuel flow signals to said control circuit means; and vehicle travel measurement means for measuring vehicle travel in small digital units of distance occurring during a measured fuel flow volume, said measurement means being connected to said control circuit means for delivering distance traveled signals thereto, said flow volume metering means including a metering cylinder for receiving said flow, a position revealing piston mounted for reciprocation in said cylinder, and a low-friction peripheral seal on said piston and engaging the inner wall of said metering cylinder.

2. The digital fuel rate monitor apparatus of claim 1 wherein said low friction peripheral seal of said piston is normally flexed on one side of center during piston travel in one direction and shiftable to a pressure relief position on the other side of center responsive to pressure of said fuel flow upon arresting of said piston travel.

3. The digital fuel rate monitor apparatus of claim 1 wherein said position revealing piston includes annular slideable stabilizing shoulder means adjacent said peripheral seal.

4. The digital fuel rate monitor apparatus of claim 1 wherein said position revealing piston includes annular slideable stabilizing shoulder means adjacent said peripheral seal, and wherein said flexible peripheral seal of said piston is normally flexed on one side of center during piston travel and shiftable to a pressure relief position on the other side of center responsive to pressure of said fuel flow upon arresting of said piston travel.

5. The digital fuel rate monitor apparatus of claim 1 that includes a control valve in said fuel flow and including first and second valve ports selectively connectable to said end ports of said metering cylinder in first and second valve positions, and a third valve position wherein said fuel flow by-passes said metering cylinder; and a piston control means for shifting said control valve between said positions.

6. A digital fuel rate monitor apparatus for vehicles comprising, in combination, control circuit means including signal producing means for producing signals proportional to units of fuel flow volume and units of distance of vehicle travel and for relating such units to effect a single digital readout in miles per gallon; a positive displacement flow volume metering means mountable in said fuel flow for measuring fuel flow in small digital units of volume, said metering means comprising a metering cylinder including a first end port and a second end port, a piston mounted for reciprocation in said cylinder, a position revealing signal means carried by said piston, a first piston control sensor on one end of said cylinder, a second piston control sensor on the other end of said cylinder; valve means mounted in said fuel flow and controlled by said piston control sensors for reversing the direction of fuel flow to and from said ports, said valve means including a fuel by-pass position wherein the fuel flow by-passes said metering cylinder; a piston control circuit for shifting said valve means; first and second piston position sensors mounted along the path of travel of said position revealing piston, one of said piston position sensors being longitudinally adjustable relative to the other of said piston position sensors to provide means for adjusting the longitudinal distance between said piston position sensors to equal the number of said units of distance traveled per wheel count, said first and second piston position sensors being connected to said control circuit means for delivering fuel flow signals thereto; and vehicle travel measurement means for determining vehicle travel in small digital units of distance occurring during travel of said piston between said piston position sensors, said vehicle travel measurement means being connected to said control circuit means for delivering distance traveled signals thereto.

7. The digital fuel rate monitor apparatus of claim 6 wherein said position revealing piston includes a low-friction flexible peripheral seal engaging the inner wall of said metering cylinder.

8. The digital fuel rate monitor apparatus of claim 7 wherein said flexible peripheral seal of said piston is normally flexed on one side of center during piston travel and shiftable to a pressure relief position on the other side of center responsive to pressure of said fuel flow upon arresting of said piston travel.

9. The digital fuel rate monitor apparatus of claim 7 wherein said piston includes annular slideable stabilizing shoulders in both sides of said flexible peripheral seal.

10. The digital fuel rate monitor apparatus of claim 7 wherein said piston includes annular slideable stabilizing shoulders in both sides of said flexible peripheral seal, and wherein said flexible peripheral seal of said piston is normally flexed on one side of center during piston travel and shiftable to a pressure relief position on the other side of center responsive to pressure of said fuel flow upon arresting of said piston travel.

11. A digital fuel rate monitor apparatus for vehicles comprising, in combination, control circuit means including signal producing means for producing signals proportional to units of fuel flow volume and units of distance of vehicle travel and for relating such units to effect a single digital readout in miles per gallon; a positive displacement flow volume metering means mountable in said fuel flow for measuring fuel flow in small digital units of volume and for delivering fuel flow signals to said control circuit means, said flow volume metering means comprising a non-magnetic metering cylinder including first and second end ports, a position revealing piston mounted for reciprocating movement in said metering cylinder, and sensors mounted along the path of travel of said piston and connected in circuit with said control circuit means; and vehicle travel measurement means for measuring vehicle travel in small digital units of distance occurring during a measured fuel flow volume, said measurement means being connected to said control circuit means for delivering distance traveled signals thereto, certain of said sensors being selectively adjustable to various positions along said path of travel of the position revealing piston 12. A digital fuel rate monitor apparatus for vehicles comprising, in combination, control circuit means including signal producing means for producing signals proportional to units of fuel flow volume and units of distance of vehicle travel and for relating such units to effect a single digital readout in miles per gallon; a positive displacement flow volume metering means mountable in said fuel flow for measuring fuel flow in small digital units of volume and for delivering fuel flow signals to said control circuit means, said flow volume metering means comprising a non-magnetic metering cylinder including first and second end ports, a position revealing piston mounted for reciprocating movement in said metering cylinder, and sensors mounted along the path of travel of said piston and connected in circuit with said control circuit means; and vehicle travel measurement means for measuring vehicle travel in small digital units of distance occurring during a measured fuel flow volume, said measurement means being connected to said control circuit means for delivering distance traveled signals thereto, said position revealing piston including a low-friction flexible peripheral seal engaging the inner wall of said metering cylinder.

13. The digital fuel rate monitor apparatus of claim 12 wherein said flexible peripheral seal of said piston in normally flexed on one side of center during piston travel in one direction and shiftable to a pressure relief position on the other side of center responsive to pressure of said fuel flow upon arresting of said piston travel.

14. The digital fuel rate monitor apparatus of claim 12 wherein said position revealing piston includes annular slideable stabilizing shoulders in both sides of said flexible peripheral seal.

15. The digital fuel rate monitor apparatus of claim 12 wherein said position revealing piston includes annular slideable stabilizing shoulders in both sides of said flexible peripheral seal, and wherein said flexible peripheral seal of said piston is normally flexed on one side of center during piston travel and shiftable to a pressure relief position on the other side of center responsive to pressure of said fuel flow upon arresting of said piston travel.

16. A digital fuel rate monitor apparatus for vehicles comprising, in combination, control circuit means including signal producing means for producing signals proportional to units of fuel flow volume and units of distance of vehicle travel and for relating such units to effect a single digital readout in miles per gallon; a positive displacement flow volume metering means mountable in said fuel flow for measuring fuel flow in small digital units of volume and for delivering fuel flow signals to said control circuit means, said flow volume metering means comprising a non-magnetic metering cylinder including first and second end ports, a position revealing piston mounted for reciprocating movement in said metering cylinder, and sensors mounted along the path of travel of said piston and connected in circuit with said control circuit means; vehicle travel measurement means for measuring vehicle travel in small digital units of distance occurring during a measured fuel flow volume, said measurement means being connected to said control circuit means for delivering distance traveled signals thereto; a control valve in said fuel flow and including first and second valve ports selectively connectable to said end ports of said metering cylinder in first and second valve positions, and a third valve position wherein said fuel flow by-passes said metering cylinder; and a piston control means for shifting said control valve between said positions.

17. A digital fuel rate monitor apparatus for vehicles comprising, in combination, control circuit means including signal producing means for producing signals proportional to units of fuel flow volume and units of distance of vehicle travel and for relating such units to effect a single digital readout in miles per gallon; a positive displacement flow volume metering means mountable in said fuel flow for measuring fuel flow in small digital units of volume and for delivering fuel flow signals to said control circuit means, said flow volume metering means comprising a non-magnetic metering cylinder including first and second end ports, a position revealing piston mounted for reciprocating movement in said metering cylinder, and sensors mounted along the path of travel of said piston and connected in circuit with said control circuit means; vehicle travel measurement means for measuring vehicle travel in small digital units of distance occurring during a measured fuel flow volume, said measurement means being connected to said control circuit means for delivering distance traveled signals thereto; a control valve in said fuel flow and including first and second valve ports selectively connectable to said end ports of said metering cylinder in first and second valve positions, and a third valve position wherein said fuel flow by-passes said metering cylinder; a piston control means for shifting said control valve between said positions; and wherein said position revealing piston includes a low-friction flexible peripheral seal engaging the inner wall of said metering cylinder.

18. A digital fuel rate monitor apparatus for vehicles comprising, in combination, control circuit means including signal producing means for producing signals proportional to units of fuel flow volume and units of distance of vehicle travel and for relating such units to effect a single digital readout in miles per gallon; a positive displacement flow volume metering means mountable in said fuel flow for measuring fuel flow in small digital units of volume and for delivering fuel flow signals to said control circuit means, said flow volume metering means comprising a non-magnetic metering cylinder including first and second end ports, a position revealing piston mounted for reciprocating movement in said metering cylinder, and sensors mounted along the path of travel of said piston and connected in circuit with said control circuit means; vehicle travel measurement means for measuring vehicle travel in small digital units of distance occurring during a measured fuel flow volume, said measurement means being connected to said control circuit means for delivering distance traveled signals thereto; a control valve in said fuel flow and including first and second valve ports selectively connectable to said end ports of said metering cylinder in first and second valve positions, and a third valve position wherein said fuel flow by-passes said metering cylinder; a piston control means for shifting said control valve between said positions; and wherein said flexible peripheral seal of said piston is normally flexed on one side of center during piston travel and shiftable to a pressure relief position on the other side of center responsive to pressure of said fuel flow upon arresting of said piston travel.

* * * * *